US009552396B2

(12) United States Patent
Hall et al.

(10) Patent No.: US 9,552,396 B2
(45) Date of Patent: Jan. 24, 2017

(54) PRIORITIZING COMMENTS

(71) Applicants: Gene Cook Hall, Mountain View, CA (US); Mahalingeshwara Bhat Saravu, Fremont, CA (US); Lee Parnell, Manor, TX (US)

(72) Inventors: Gene Cook Hall, Mountain View, CA (US); Mahalingeshwara Bhat Saravu, Fremont, CA (US); Lee Parnell, Manor, TX (US)

( * ) Notice: Subject to any disclaimer, the term of this patent is extended or adjusted under 35 U.S.C. 154(b) by 523 days.

(21) Appl. No.: 14/151,654

(22) Filed: Jan. 9, 2014

(65) Prior Publication Data
US 2015/0193442 A1 Jul. 9, 2015

(51) Int. Cl.
G06F 7/00 (2006.01)
G06F 17/30 (2006.01)
G06Q 10/10 (2012.01)

(52) U.S. Cl.
CPC ..... *G06F 17/3053* (2013.01); *G06F 17/30038* (2013.01); *G06Q 10/10* (2013.01); *G06Q 10/107* (2013.01)

(58) Field of Classification Search
CPC ............................. G06F 17/30038
See application file for complete search history.

(56) References Cited

U.S. PATENT DOCUMENTS

2013/0282594 A1* 10/2013 Gaedcke ............ G06Q 30/016
705/304

* cited by examiner

*Primary Examiner* — Ajith Jacob
(74) *Attorney, Agent, or Firm* — Plager Schack LLP

(57) ABSTRACT

A method for prioritizing comments is disclosed. Some embodiments quantify comments by allowing other respondents to agree and identify priorities among comments left by others. In some embodiments, the method for prioritizing comments includes steps for selecting a set of comments, presenting the set of comments, and receiving one or more respondent-initiated responses to the set of comments. In some embodiments, the method further includes entering a starting set of comments into the pool of all comments prior to select the comments. In some embodiments, the method further includes receiving an input to add a comment and incorporating the new comments into the pool of all comments.

11 Claims, 3 Drawing Sheets

PRIORITIZING COMMENTS

BACKGROUND

Embodiments of the invention described in this specification relate generally to methods for prioritizing, and more particularly, to prioritizing digital comments.

Prioritizing comments is a time-consuming and expensive process. In particular, when Internet users provide digital comments at web sites, prioritizing those comments typically requires that one or more persons access web sites on which comments are posted or published, and then tediously determine the priority of each comment in light of the priority of each other comment. There are a number of problems with this manner of prioritizing comments. Specifically, individually accessing and prioritizing each comment is expensive (in some cases, prohibitively expensive), and the process for determining the priority to set for a comment is fraught with risk of prioritization errors. For instance, using existing ways to prioritize comments may lead to undervalued or entirely missed important comments.

Also, prior methods for prioritizing comments have generally relied on saved responses that were previously saved after being scored by previous respondents. Moreover, prior methods have typically needed a set of comments to start the process for prioritizing comments.

Therefore, what is needed is a way to quantify comments by allowing other respondents to agree and identify priorities among comments left by others, without requiring a set of comments to start the process, and without storing responses in computer memory and without using scores submitted by previous respondents to determine which ideas to sample.

BRIEF DESCRIPTION

Some embodiments of the invention include a novel method for prioritizing comments. In some embodiments, the method for prioritizing comments comprises selecting a set of comments, presenting the set of comments, and receiving one or more respondent-initiated responses to the set of comments. In some embodiments, the method further comprises entering a starting set of comments into the pool of all comments prior to select the comments. In some embodiments, the method further comprises receiving an input to add a comment and incorporating the new comments into the pool of all comments.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
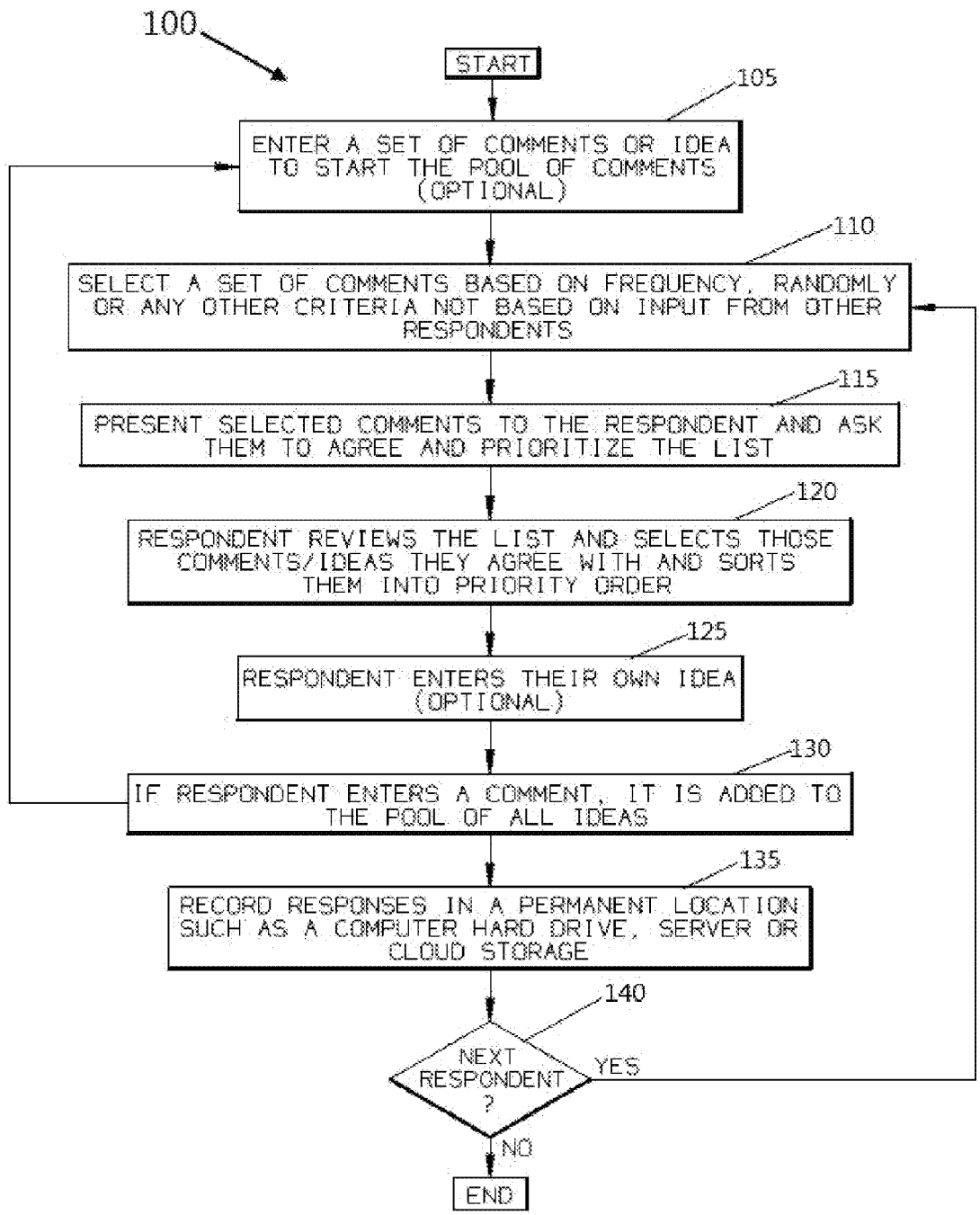
FIG. 1 conceptually illustrates a process for prioritizing comments in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel method for prioritizing comments. In some embodiments, the method for prioritizing comments comprises selecting a set of comments, presenting the set of comments, and receiving one or more respondent-initiated responses to the set of comments. In some embodiments, the method further comprises entering a starting set of comments into the pool of all comments prior to select the comments. In some embodiments, the method further comprises receiving an input to add a comment and incorporating the new comments into the pool of all comments.

In some embodiments, the method is implemented as a software application that includes sets of instructions for performing the steps of the method when the software application is running on a processor of a computing device. In some embodiments, the software application accesses one or more computing devices over the Internet. In some embodiments, the software application connects to a web application server that accesses one or more social media websites and a persistent data storage. In some embodiments, the persistent data storage is a database accessible through a database management system running on the processor of the computing device on which the software application is running. In some embodiments, the software application is a client-side application that accesses a cloud database management system.

As stated above, prioritizing comments is a time-consuming and expensive process that includes many opportunities in which comment prioritization errors may arise. Embodiments of the invention described in this specification solve such problems by allowing survey respondents to prioritize the comments of other survey respondents.

The embodiments described in this specification differ from and improve upon currently existing options. In particular, most current methods require survey sponsors to read comments and categorize them after the survey is completed. The task is tedious, time-consuming and expensive. Readers of comments are not the authors of the comments. As a result, the categorizations in which readers place comments can be inaccurate. Other methods are driven by lower-cost but complex algorithms which may not be accurate. Another issue is that other methods are driven by the frequency of comments in each category, while some important ideas may be overlooked if only one person expresses the idea. In one example process, a feedback loop technique is utilized in which comments are selected for prioritization based on scores submitted by previous respondents, responses of which are stored in computer memory.

Moreover, this technique requires a set of comments to start the process. In contrast, the method for prioritizing comments of some embodiments does not require comments to actually start the process, and scores are not stored in computer memory. Thus, the method described here can operate from a blank slate at any given time.

In addition, these embodiments improve upon the currently existing options by providing a distribution of work that simplifies the comment retrieval process. Other methods focus the work load on the survey sponsor or require complicated feedback systems to work. However, embodiments of this invention quantify comments by allowing other respondents to agree and identify priorities among comments left by others without storing responses in computer memory and without the use of scores submitted by previous respondents. Furthermore, the method does not require a set of comments to start the process.

The method for prioritizing comments of the present disclosure may be comprised of the following steps. This list of possible constituent steps is intended to be exemplary only and it is not intended that this list be used to limit the method for prioritizing comments of the present application to just these steps. Persons having ordinary skill in the art relevant to the present disclosure may understand there to be equivalent steps that may be substituted within the present disclosure without changing the essential function or operation of the method.

1. Optionally enter a starting set of comments into the pool of all comments
2. Select comments
3. Present comments
4. Respondent responds to the comments
5. Add comment
6. Incorporate new comments into the pool of all comments The method for prioritizing comments of the present disclosure generally works by following the above-listed steps, with the optional steps (i.e., steps 1, 5, and 6) being skipped in times when the method does not actually perform those optional steps. When the method operates, the scores are gathered for future processing and analysis. However, the first person who comes through the survey may not have a list of comments and their only choice will be to add a comment or skip to the next task. If no comment is added at step 5, then step 6 is not needed. Likewise, if a comment is added at step 5, then step 6 is required in some embodiments.

By way of example, FIG. 1 conceptually illustrates an example of a process for prioritizing comments in some embodiments. As shown in this figure, the process 100 starts at one or two different operations. In at least one embodiment, the process 100 enters (at 105) a set of comments or ideas to start a pool of comments. In another embodiment, the process 100 skips the step at 105 (for entering the set of comments) and starts by selecting (at 110) a set of comments based on frequency, randomness, or other criteria not based on input from other respondents.

Next, the process 100 transitions to the step at 115 to present selected comments to the respondent and ask the respondent to agree and prioritize the list. Then the process 100 moves on to step 120 in which the respondent reviews the list and selects any comments and/or ideas that the respondent agrees with. The process 100 also sorts (at 120) the comments and/or ideas into one or more prioritized orders.

In some embodiments, the process 100 allows the respondent to enter (at 125) their own idea. In some embodiments, a starting set of comments (at 105) occurs once before respondents come into the survey. The starting set of comments is typically completed by a sponsor of the survey. Nevertheless, if a respondent enters a new comment, the process 100 adds (at 130) the comment to the pool of all ideas.

On the other hand, in some embodiments the process 100 continues without transitioning back to step 105. Instead, the process 100 of these embodiments records (at 135) responses in a permanent location. For instance, the software application may persist the responses on a computer hard driver or in a database accessed through a cloud-based server or general application server system. After persisting the responses, in some embodiments the process 100 then determines (at 140) whether there are more respondents to process. If there is at least one more respondent, the process transitions back to selecting (at 110) a set of comments.

To make the method for prioritizing comments of the present disclosure, a person would need to develop a software application to perform the above-listed steps. As the process 100 of some embodiments can function in networked environments, any software application developed for the process 100 should be included in a networked system. For example, a software application that acts as a client application may be connected to a network, such as the Internet, and connect to a web server in order to perform one or more of the steps of the process 100.

Figure 2:
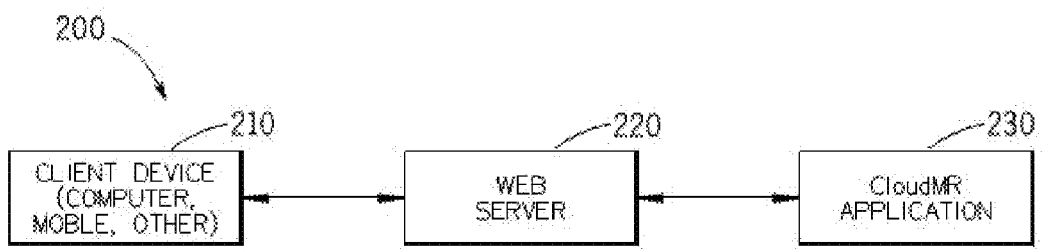
FIG. 2 conceptually illustrates a high level schematic view of a system architecture that facilitates prioritizing comments in some embodiments.

By way of example, FIG. 2 conceptually illustrates a high level schematic view of a system architecture that facilitates prioritizing comments in some embodiments. As shown in this figure, the system 200 includes a client computing device 210, a web server 220, and a cloud manager application 230 operating on a back-end computing device. In some embodiments, the client computing device 210 connects over a network to the web server 220. By connecting to the web server 220, the client computing device can send and receive data. For instance, the client computing device 210 may send requests to the web server 220 for data that is provided by the cloud manager application 230. In some embodiments, the web server 220 processes requests for data that are received from client computing devices and communicates with the cloud manager application 230 (over the network), to retrieve/receive the requested data. After receiving the requested data from the cloud manager application 230, the web server 220 transmits the data to the appropriate requesting client computing device 210.

With respect to the specific steps of the process 100, step 1 is an optional step and new comments can be entered by the sponsor of the research at any time before or during the survey process. Steps 2 through 4 are necessary for the process to function. The first one or more respondents may not be able to review a list at step 3 until one or more comments have been added by previous respondents. Steps 5 and 6 are optional. Respondents are not required to add comments. If a new comment is added by the respondent, it becomes part of the pool of all comments. Also, the order of the steps may be changed as needed. For example, the respondent can enter a comment first; and then steps 5 and 6 can be performed prior to steps 2, 3, and/or 4. Step 1 can occur any time before or during the research process.

To use the method for prioritizing comments of the present disclosure, a person would need to include an open-ended question in any questionnaire and decide if an initial set of comments will be used to start the survey and develop those ideas if needed. The person would also need to decide if the respondents will add comments before, during, or after the prioritization process (or in some cases, during the prioritization process). The person could then field the survey.

Additionally, embodiments of this invention can be used in place of any open-ended question, any question where the researcher is not able to create a complete answer list and any situation where the sponsor wants to gather and prioritize comments.

While a system architecture is described by reference to FIG. 2, above, in some embodiments, the architecture of the system 200 includes multiple client computing devices 210 and the cloud manager application running on the back-end computing device includes one or more databases, user and/or admin interfaces, and application programmer's interfaces (APIs).

Figure 3:
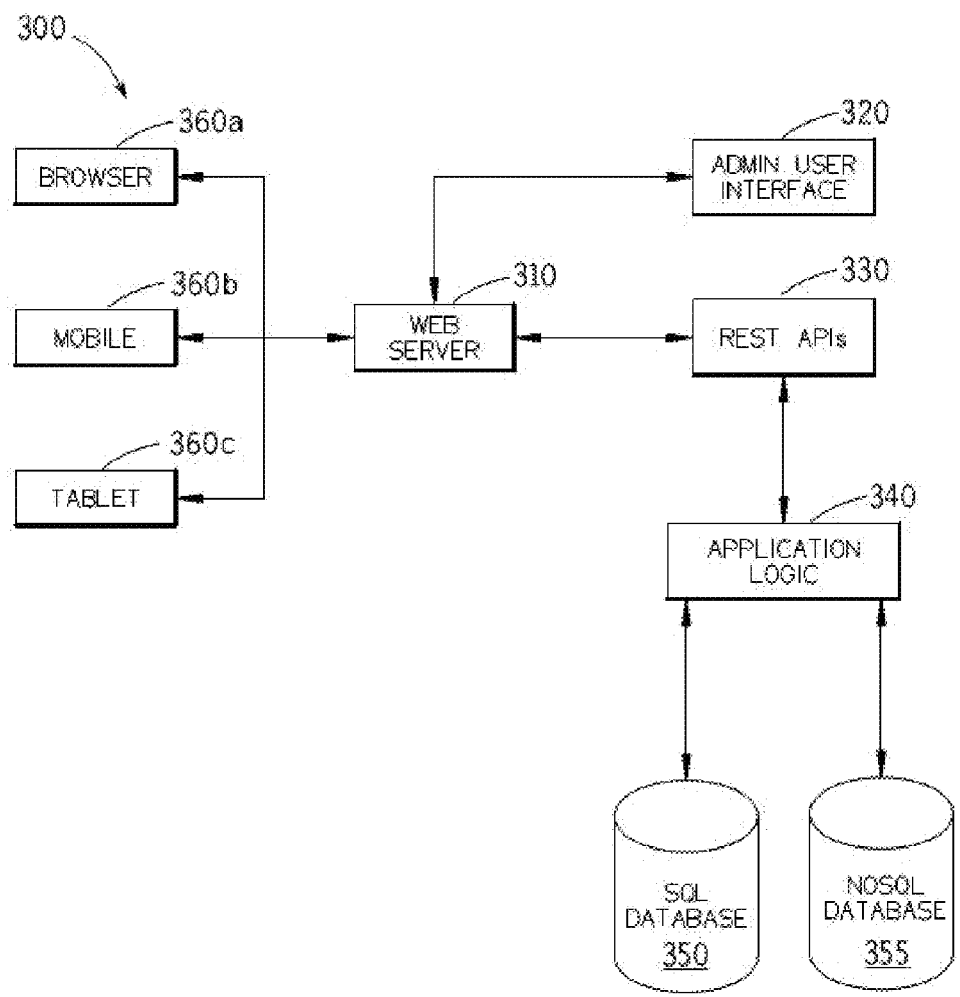
FIG. 3 conceptually illustrates a detailed schematic view of a system architecture that facilitates prioritizing comments in some embodiments.

FIG. 3 conceptually illustrates a detailed schematic view of a system architecture that facilitates prioritizing comments in some embodiments. As shown in this figure, the system 300 includes a web server 310, a computing device that provides an admin user interface 320, a computing device that provides one or more rest APIs 330, a computing device that includes application logic 340, a database that supports Structured Query Language (SQL) 350, a NoSQL database 355, and a plurality of client computing devices 360a-360c. Each of the client computing devices 360a, 360b, and 360c connects to the web server 310 over a network, such as the Internet, to send and receive data. In some embodiments, the data is retrieved from either or both databases 350 and 355 via application logic 340 accessed through one or more of the rest APIs 330. In some embodiments, the rest API's are implemented on the web server and data is retrieved via application logic 340 that is implemented in a relational database management system (RDBMS). In this way, the web server 310 is able to facilitate prioritizing comments from any of several different client computing devices, including a browser application that operates on a computer 360a (e.g., a desktop computer, a laptop computer, etc.), a client app operating on a mobile computing device 360b, and a client app operating on a tablet computing device 360c.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
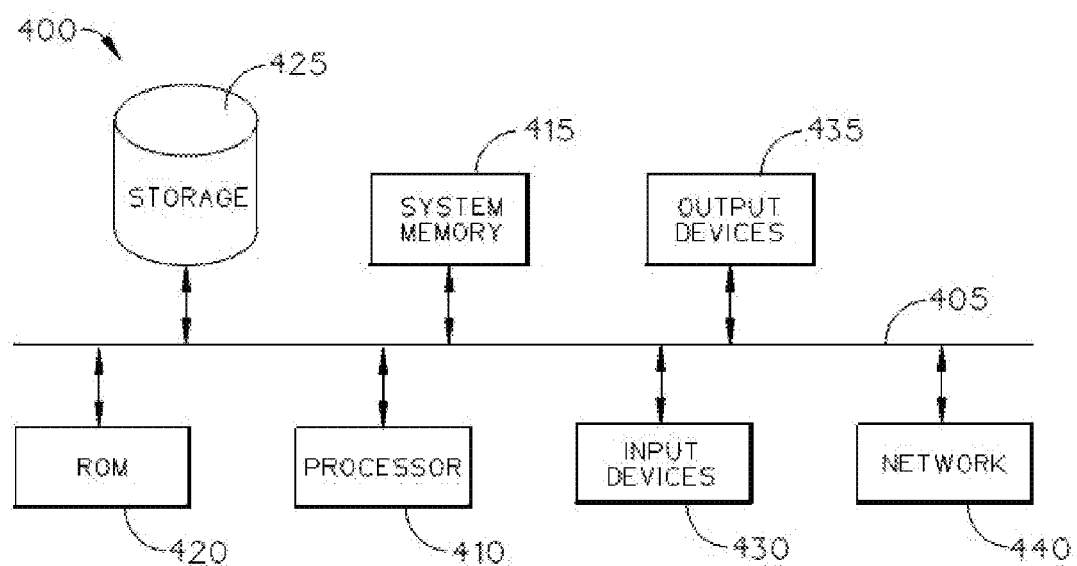
FIG. 4 conceptually illustrates an electronic system with which some embodiments of the invention are implemented.

FIG. 4 conceptually illustrates an electronic system 400 with which some embodiments of the invention are implemented. The electronic system 400 may be a computer, phone, PDA, or any other sort of electronic device. Such an electronic system includes various types of computer readable media and interfaces for various other types of computer readable media. Electronic system 400 includes a bus 405, processing unit(s) 410, a system memory 415, a read-only 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only 420. For example, the various memory units include instructions for processing appearance alterations of displayable characters in accordance with some embodiments. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards and pointing devices (also called "cursor control devices"). The output devices 435 display images generated by the electronic system 400. The output devices 435 include printers and display devices, such as cathode ray tubes (CRT) or liquid crystal displays (LCD). Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates a process for prioritizing comments. The specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A system that prioritizes comments comprising:
   a client computing device comprising a processor, a memory, a display screen, and a non-transitory computer readable storage medium storing a client program which when executed by the processor prioritizes comments, said client program comprising sets of instructions for:
      selecting a set of comments from a plurality of pooled comments, wherein the set of comments and the plurality of pooled comments are related to a particular matter;
      displaying the set of comments related to the particular matter on the display screen; and
      providing a respondent-initiated response to a particular comment in the set of comments related to the particular matter;
   a web server computing device comprising a web server processor, a web server memory, and a non-transitory computer readable medium storing a comment prioritization web portal program which when executed by the web server processor facilitates comment prioritization by respondent clients, said comment prioritization web portal program comprising sets of instructions for:
      receiving a network connection request from the client computing device to access a cloud manager application service for prioritizing comments; and
      enabling the network connection from the client computing device, wherein the enabled network connection allows the client computing device to access the cloud manager application service for prioritizing comments and data transmission between the client computing device and the cloud manager application service is facilitated by the web server computing device; and
   a back-end server computing device comprising a back-end server processor, a back-end server memory, and a non-transitory computer readable medium storing a cloud manager application program which when executed by the back-end server processor provides a cloud manager application service for prioritizing comments, said cloud manager application program comprising sets of instructions for:
      retrieving the selected set of comments from a database that is communicably connected to the back-end server computing device;
      providing the retrieved set of comments to the web server for transmission to the client computing device for display on the display screen of the client computing device; and
      receiving the respondent-initiated response to the particular comment in the set of comments related to the particular matter.

2. The system that prioritizes comments of claim 1 further comprising an administrative researcher computing device comprising an admin processor, an admin memory, an admin display screen, and a non-transitory computer readable storage medium storing an admin program which when executed by the admin processor provides an administrative researcher user interface for preparing a comment prioritization program to prioritize comments, said admin program comprising a set of instructions for defining the particular matter.

3. The system that prioritizes comments of claim 2, wherein the admin program further comprises sets of instructions for:
   selecting a starting set of comments for the particular matter; and
   entering the starting set of comments into the plurality of pooled comments.

4. The system that prioritizes comments of claim 3, wherein the starting set of comments are entered into the plurality of pooled comments after the particular matter is defined.

5. The system that prioritizes comments of claim 1, wherein the client program further comprises a set of instructions for receiving an input to add a new comment, said input entered by the respondent.

6. The system that prioritizes comments of claim 5, wherein the cloud manager application program further comprises a set of instructions for incorporating the new comment into the pool of all comments.

7. The system that prioritizes comments of claim 1 further comprising a second client computing device comprising a second processor, a second memory, a second display screen, and a second non-transitory computer readable storage medium storing a second client program which when executed by the second processor prioritizes comments, wherein the second client program comprises sets of instructions for:
- displaying the particular comment in the set of comments related to the particular matter on the second display screen, wherein the particular comment is displayed on the second display screen with the respondent-initiated response;
- providing a second respondent-initiated priority for the particular comment; and
- providing a second respondent-initiated response comprising an agreement with the respondent-initiated response to the particular comment.

8. The system that prioritizes comments of claim 7, wherein the cloud manager application program further comprises sets of instructions for:
- receiving the second respondent-initiated priority for the particular comment;
- receiving the second respondent-initiated response; and
- saving the second respondent-initiated priority and the second respondent-initiated response in the database that is communicably connected to the back-end server computing device.

9. The system that prioritizes comments of claim 8, wherein the cloud manager application program further comprises a set of instructions for identifying priorities of the comments from all respondents.

10. The system that prioritizes comments of claim 1, wherein the cloud manager application program further comprises a set of instructions for storing responses in the database that is communicably connected to the back-end server computing device and not stored in computer memory.

11. The system that prioritizes comments of claim 1, wherein the set of comments related to the particular matter are displayed in a first order of priority positions and the particular comment is displayed at an initial priority position in the first order of priority positions, wherein the client program further comprises sets of instructions for:
- receiving a change of position of the particular comment from the initial priority position in the first order of priority positions to a different subsequent priority position;
- displaying the set of comments related to the particular matter in a second order of priority positions that is different from the first order of priority positions, wherein the particular comment is positioned at the different subsequent priority position in the second order of priority positions; and
- providing a respondent-initiated priority for the particular comment based on the different subsequent priority position of the particular comment in the second order of priority positions.

* * * * *